INVENTORS
ERNEST A. GARDNER
PORTER T. McCAULEY

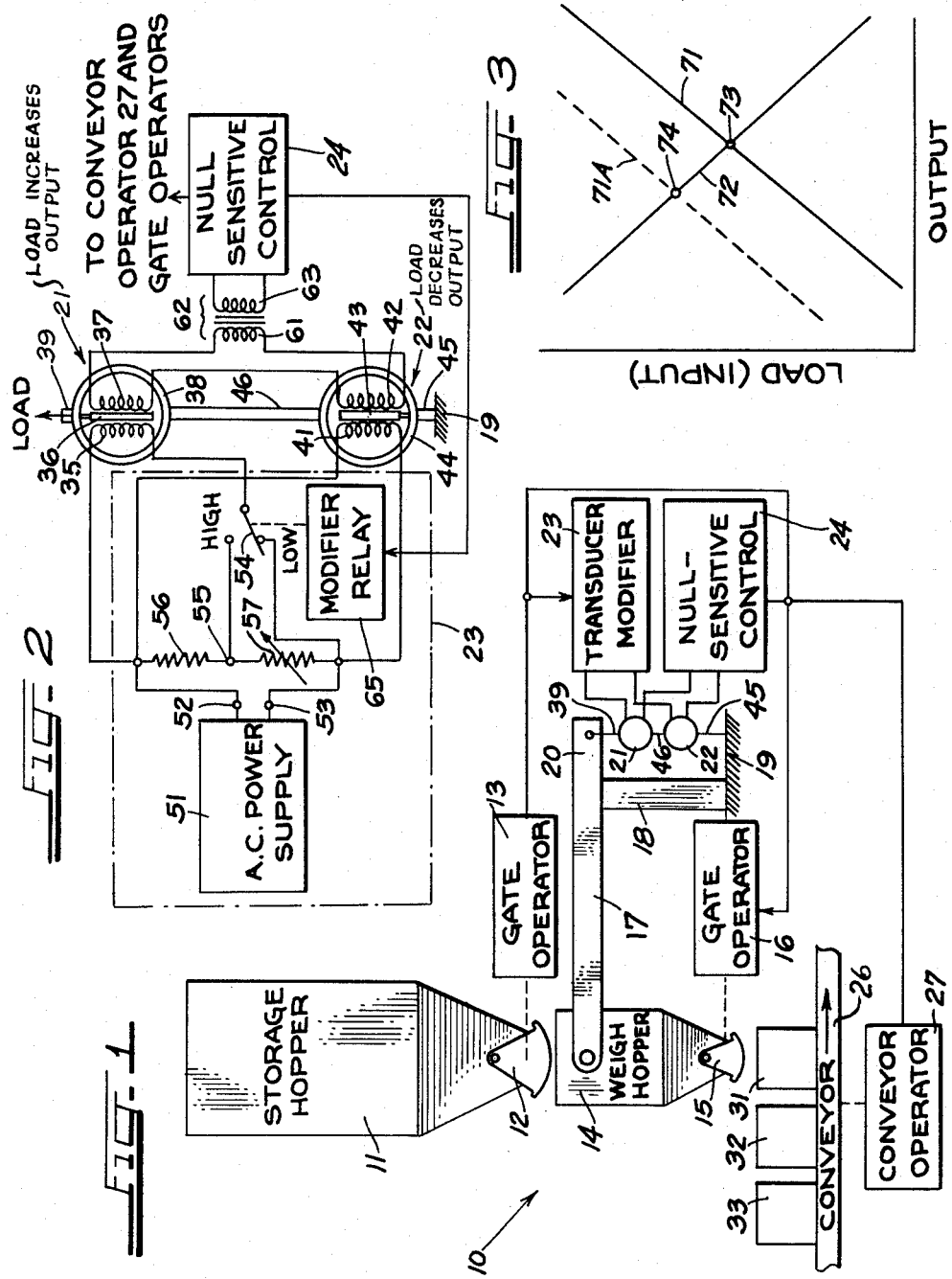

United States Patent Office 3,133,607
Patented May 19, 1964

3,133,607
MEASUREMENT AND CONTROL SYSTEMS
Ernest A. Gardner, Lyons, and Porter Thompson McCauley, Winnetka, Ill., assignors to Count-Way, Inc., Skokie, Ill., a corporation of Illinois
Filed Apr. 6, 1962, Ser. No. 185,544
7 Claims. (Cl. 177—108)

This invention relates to a new and improved measurement and control system. The invention is particularly advantageous as applied to a weighing system, and is described in that connection, but can also be applied to other measurement applications.

Accurate measurement of physical conditions, such as weight, present substantial problems, particularly in industrial applications and other applications in which environmental conditions may vary to a substantial extent. Thus, most forms of sensing apparatus are subject to drift in response to changes in temperature, humidity, and other factors. Many arrangements have been proposed heretofore to compensate for specific changes in environment, in applications of this kind. However, these compensation arrangements generally do not afford adequate protection against any and all environmental variations; moreover, in many instances, the compensation apparatus adds substantially to the cost and complexity of the basic measuring system.

It is a principal object of the present invention, therefore, to provide a new and improved measurement and control system, of precision accuracy, that is highly versatile in application.

Another object of the invention is to provide a positive-acting measurement and control system that may be quickly and conveniently calibrated in accordance with the requirements of individual applications.

A specific object of the invention is to afford a new and improved measurement and control system that is essentially independent of any and all changes in environmental conditions at the point of measurement, including particularly changes in temperature, voltage and humidity. A related object of the invention is to provide for substantially complete independence from changes in environment in a weighing system utilized to dispense predetermined quantities of material in a substantially automatic operation.

Another object of the invention is to afford a means for eliminating errors due to changes in environmental conditions in a measurement and control system using either A.C. or D.C. transducers.

A corollary object of the invention is to provide a new and improved measurement and control system that is substantially independent of environmental changes but is relatively simple and economical in construction.

A measurement and control system constructed in accordance with the invention comprises first and second transducer means for sensing a given physical condition, these transducer means each being effective to develop an output signal representative of the physical condition. The two transducer means are subject to essentially identical environments, preferably being located at approximately the same point in the control apparatus. Both of the transducer means are coupled to a control means that is effective to combine the two output signals from the transducer means, additively, to develop a control signal that is representative of the physical condition and substantially independent of environmental changes affecting the transducers. Means are provided, coupled to one of the transducer means, for modifying the output of the one transducer means, relative to the other, to define a plurality of distinctive control signals representative of predetermined levels of the physical condition being measured.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a simplified elevation view, partially schematic, of weighing apparatus incorporating a measurement and control system constructed in accordance with one embodiment of the present invention;

FIG. 2 is a simplified circuit diagram of a portion of the weighing system of FIG. 1;

FIG. 3 is a diagram of certain operating characteristics of the system of FIGS. 1 and 2;

Figure 4:
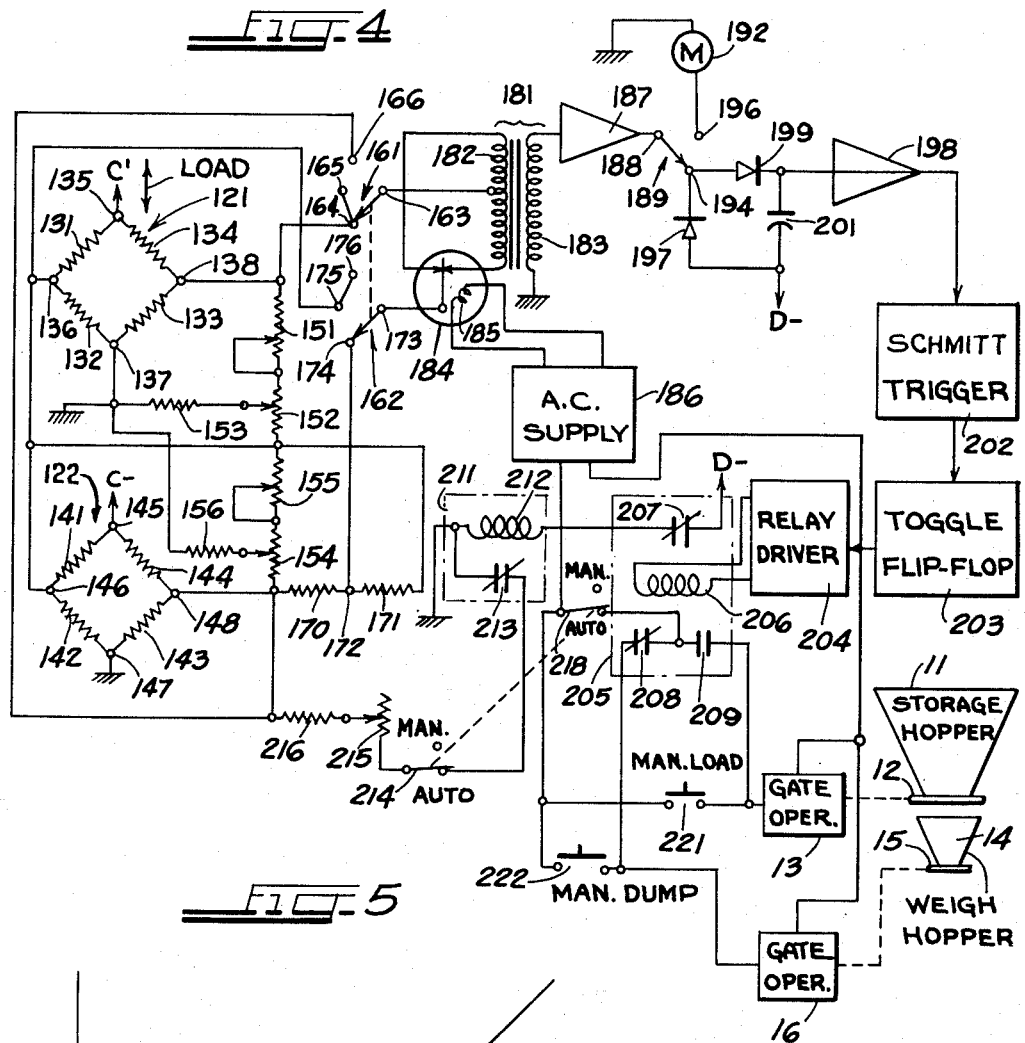
FIG. 4 illustrates a preferred embodiment of the invention, utilizing a different form of transducer means than that of FIG. 2.

FIG. 1 illustrates a weighing apparatus 10 that incorporates a measurement and control system constructed in accordance with one embodiment of the present invention. Weighing system 10 includes a storage container or hopper 11 for storing material to be weighed, hopper 11 being provided with a suitable discharge gate 12 that is mechanically connected to an electrically actuated gate operating mechanism 13. A weighing container 14 is located below storage container 11 in position to receive material discharged through gate 12. Weighing container 14 is provided with a suitable discharge gate 15 that is mechanically connected to a gate operating mechanism 16.

Weighing container 14 is suspended from a cantilever beam 17, the principal support for the cantilever beam being provided by a support post 18 projecting from a base 19. Cantilever beam 17 is extended beyond support post 18, the extension portion 20 being connected to base 19 by a pair of transducers 21 and 22 that are mechanically connected in series with each other. Transducers 21 and 22 are both electrically coupled to a transducer driver and modifier circuit 23. The outputs of the two transducers are connected to a null-sensitive control circuit 24. The output of contol circuit 24, in turn, is connected to each of gate operating devices 13 and 16 and to the transducer driving and modifier circuit 23.

Weighing system 10 further includes a conveyor 26 driven by a conveyor operating mechanism 27. Conveyor 26 and operating mechanism 27 may be conventional in construction and, accordingly, are shown only schematically. The conveyor operating mechanism is subject to electrical control and is coupled to the output of control circuit 24. Conveyor 26 is operated in intermittent manner to position a series of containers 31, 32 and 33, in sequence, beneath weighing hopper 14 in position to receive material discharged from the weighing hopper through gate 15.

FIG. 2 affords a more detailed illustration of transducers 21 and 22 and their relation to circuits 23 and 24. As shown therein, device 21 comprises a transducer of the force-ring type, referred to hereinafter as a force transformer. The force transformer includes an input winding 35 coupled through a core 36 to an output winding 37. Transducer core 36 is mounted on a support ring 38 that is mechanically connected to extension portion 20 of beam 17 by means of a member 39 (see FIG. 1).

The second transducer means 22 is also a sensing transformer of the force-ring type. Thus, transducer 22 comprises an input winding 41 and an output winding 42, the two windings being provided with a core 43 that is carried by a force ring 44. One side of the force ring 44 is connected to base member 19 by a mechanical connecting member 45; the other side of the force ring is connected to force ring 38 of the first transducer by a suitable member 46. It is thus seen that transducers 21 and 22 are mechanically connected in series with each other between beam 17 and base 19 (see FIG. 1) in an arrangement such that each of the two transducers is effective to sense changes in loading of the beam.

The circuit arrangement shown in FIG. 2 includes an A.C. power supply 51, having output terminals 52 and 53, which may be of conventional construction. It is not necessary to use a regulated power supply, since the system is self-compensating for voltage variations. Primary winding 41 of transducer 22 is connected directly across power supply terminals 52 and 53. One terminal of primary winding 35 of transducer 21 is connected directly to power supply terminal 52. The other end of primary winding 35 is connected through a switch 54 to the remaining power supply terminal 53. Switch 54 is a single-pole double-throw device; in one position, the switch connects transducer winding 35 directly to power supply terminal 53. Actuation of switch 54 to its alternate position, however, connects the transducer winding to the center terminal 55 of a voltage divider comprising two resistors 56 and 57 connected across the power supply terminals. Thus, switch 54 can be actuated to modify the input to transducer 21, and thereby modify the output of the transducer as explained hereinafter.

The secondary windings 37 and 42 of the two transducers are connected in series with each other, but in phase opposition, across the primary winding 61 of an output transformer 62. The secondary winding 63 of this transformer is connected to null-sensitive control circuit 24. As described hereinabove in connection with FIG. 1, the output of circuit 24 is connected to conveyor operator 27 and to gate operators 13 and 16. In addition, the circuit 24 is connected to a modifier relay apparatus 65 that, with power supply 51, and voltage divider 56, 57, comprises the transducer-driver modifier circuit 23. Switch 54 may comprise one set of contacts of relay apparatus 65, a mechanical connection between the relay apparatus and the switch illustrating this relationship.

In operation of the weighing system illustrated in FIGS. 1 and 2, the first step is to calibrate the system with respect to a no-load condition. For this purpose, the control switch 54 is established in the position shown in FIG. 2, identified as the "low" position of the switch. Power supply 51 is then adjusted to afford an output voltage across terminals 52 and 53 that produces precisely equal voltages across the output windings 37 and 42 of the transducers 21 and 22. As noted above, windings 37 and 42 are connected in phase opposition to each other. Thus, the initial calibration establishes a first null condition in the combined output circuits of the two transducers. This condition represents the strain on the two transducers produced by the tare weight of hopper 14 and beam 17. It may be desirable to establish a tare condition with a small quantity of the material that is to be weighed present in hopper 14 in order to avoid any necessity for complete discharge from the weighing container in the course of each weighing operation.

The next step in calibration of weighing system 10 is to actuate switch 54 to its alternate or "high" position, so that primary winding 35 of transducer 21 is connected to the voltage divider 56—57 instead of the former direct connection to power supply terminals 52 and 53. A weight equal to the desired weight to be measured in each operation of system 10 is deposited in hopper 14. The variable impedance in the voltage divider, resistor 57, is then adjusted to change the excitation voltage applied to input winding 35 of transducer 21 until the output of this transducer is again exactly equal in amplitude to the output voltage across winding 42 of transducer 22. That is, the voltage divider is adjusted to afford a second distinctive null condition representative of a predetermined weight of material in hopper 14.

In order to achieve effective results, and to be able to establish more than one distinctive null condition, it is necessary that the input-output characteristics of the two transducers be different from each other. Otherwise, it will not be possible to establish two clearly identifiable null conditions for the weighing system. One effective means to establish this differential between the two force ring transformers is to connect the two with differential-load output characteristics. Thus, in the illustrated system, transducer 21 is mechanically connected, with respect to the load applied to beam 17, so that an increase in weight at the end of the beam, as by the deposition of material in hopper 14, increases the output signal from the transducer. This operating characteristic is represented by the load-output line 71 in FIG. 3. The other transducer, force transformer 22, is connected in the system so that a decrease in secondary voltage is realized in response to an increase of load represented by an increase in the weight of hopper 14. In FIG. 3, the input-output characteristic of transducer 22 is represented by the load line 72. Load lines 71 and 72 illustrate the operating characteristic of the two transducers when subject to equal excitation and thus correspond to the transducer operating characteristics applicable when switch 54 is in its "low" or tare position as shown in FIG. 2. The intersection of load lines 71 and 72, point 73 in FIG. 3, represents the first null condition for the system.

Of course, when switch 54 is actuated to its "high" or weighing position, the input-output characteristic of transducer 21 is modified due to the change in input voltage as compared with the input voltage to transducer 22. This modified load characteristic for transducer 21 is illustrated, in FIG. 3, by line 71A. It is seen that load-output characteristic line 71A intersects line 72 at a different point 74, identifying the second null condition for the system, this being the null condition corresponding to the weight of material to be dispensed into each of containers 31—33.

After calibration is completed, the system is ready to perform a substantially automatic weighing operation. At the outset, switch 54 is established in the "high" or weighing position. Gate operator 16 holds the weighing hopper gate 15 closed, whereas device 13 opens discharge gate 12 on storage container 11. The material to be weighed is discharged from the storage hopper and deposited in the weighing hopper. At the outset, the difference in excitation of transducers 21 and 22, created by actuation of switch 54 to the "high" position, establishes an unbalanced output signal condition. That is, the voltages across windings 37 and 42 are unequal, with the result that an appreciable signal is supplied to control circuit 24 through its input transformer 62. As long as this condition is maintained, gate 12 is held open and gate 15 is maintained closed.

Ultimately, the precise desired weight of material is deposited in hopper 14, the outputs from transducers 21 and 22 accordingly becoming balanced at null point 74. This condition is detected by the null-sensitive control circuit 24, which produces an output signal that is supplied to gate operators 13 and 16 and to the transducer modifier relay apparatus 65. In response to this control signal, gate operator 13 actuates gate 12 to its closed position, cutting off further flow of material from storage hopper 11 to the weighing hopper 14. Gate operator 16, on the other hand, opens gate 15 to discharge material from the weighing hopper into container 31. Relay apparatus 65 actuates switch 54, throwing this switch to its "low" or tare position.

The change in the position of switch 54 again provides an unbalanced output from transducers 21 and 22, since the two transducers are now subject to equal-amplitude energization signals. The material flowing from hopper 14, through gate 15, eventually reduces the load on transducers 21 and 22 to a point at which the output signals from the two transducers are again balanced. That is, the transducers reach the null position 73 representative of the established tare weight for the system. This null condition is again detected by control circuit 24 and is utilized to produce a control signal that actuates gate operators 13 and 16, again closing gate 15 and opening gate 12 to initiate a second loading cycle. This control signal may also be supplied to conveyor operator 27 to actuate conveyor 26 and move the next container 32 into loading position beneath weighing hopper gate 15.

From the foregoing description, it is seen that the two transducers of the system, force transformers 21 and 22, effectively sense a given physical condition, in this instance the weight of beam 17 and hopper 14. Each of the transducers develops an electrical signal that is representative of the condition being sensed. These two output signals are additively combined in the input of control circuit 24 and are utilized to develop a control signal for the system. This control signal is modified, by means of switch 54, to define two distinctive control signal nulls, one of which represents the tare weight of the weighing apparatus and the other of which represents the desired weight of material to be dispensed. Of course, in order to achieve null signal conditions, it is necessary that the output signals from the transducers be combined in subtractive relation to each other. Moreover, as noted above, it is necessary that the force transformers have differential load-output characteristics, or that the load-output characteristics at least be substantially different from each other.

In weighing system 10, transducers 21 and 22 are disposed immediately adjacent each other and are subject to essentially identical environments. That is, any change in temperature affecting one transducer also affects the other. This is equally true with respect to humidity, voltage and other environmental factors. Consequently, any drift in either transducer, relative to the normal operating characteristics illustrated in FIG. 3, tends to be compensated by the corresponding drift in operation of the other transducer. Accordingly, operation of the system is rendered substantially independent of environmental changes with the result that substantially improved accuracy in operation is achieved.

FIG. 4 illustrates a weighing system 110 constructed in accordance with another embodiment of the present invention. System 110 includes certain components that may be essentially similar to elements of the system shown in FIG. 1. For example, weighing system 110 comprises a storage hopper 11 having a discharge gate 12 through which material is discharged into a weighing hopper or container 14. Weighing hopper 14, in turn, is equipped with a suitable discharge gate 15. Gate 12 is again actuated by a gate operating device 13, and a gate operating device 16 actuates discharge gate 15.

Weighing system 110 comprises a pair of transducers 121 and 122 that are substantially different from the force transformers 21 and 22 of the embodiment of FIGS. 1 and 2, but which serve a substantially similar purpose. Thus, transducer 121 constitutes a conventional strain gauge bridge comprising resistances 131, 132, 133 and 134. Transducer 122 constitutes a similar strain gauge bridge including four resistances 141, 142, 143 and 144. In bridge circuit 121, the upper terminal 135 is connected to a D.C. supply identified as C—; the corresponding terminal 145 in bridge 122 is also connected to the C— supply. The lowermost terminal 137 in transducer bridge 121 and the corresponding terminal 147 in transducer bridge 122 are both returned to ground. The two corresponding output terminals 136 and 146 of bridges 121 and 122 respectively are connected to each other. The remaining output terminal 138 of bridge 121 is connected to terminal 136 through a potentiometer 151 and an adjustable tapped resistor 152, the tap on resistor 152 being returned to ground through resistor 153. A similar circuit is used for bridge 122 and comprises a variable tapped resistor 154 connected in series with a potentiometer 155 between terminals 148 and 146 of the bridge. The tap on resistor 154 is returned to ground through a resistor 156.

Weighing system 110 includes a pair of single-pole triple-throw selector switches 161 and 162 that are utilized for calibration purposes and are connected in the output circuits of transducers 121 and 122, the two switches being ganged. Switch 161 comprises an output terminal 163 connectable to any one of three input terminals 164, 165 and 166. In normal operation of the system, switch 161 is closed on terminal 164 as illustrated in FIG. 4. Both of switch terminals 164 and 165 are connected to output terminal 138 of transducer bridge 121. Terminal 166, on the other hand, is connected to terminal 148 of the second strain gauge bridge 122.

Switch 162 includes an output terminal 173 connectable to three input terminals 174, 175 and 176. Terminals 175 and 176 are connected together and are connected to output terminals 136 and 146 of the two transducers. Switch terminal 174, on the other hand, is connected to the center terminal 172 of a voltage divider comprising two resistors 170 and 171 connected in series with each other between terminals 146 and 148 of transducer 122.

The strain gauge bridges 121 and 122, as noted above, are of conventional construction; for example, they may comprise standard strain gauges of the kind manufactured by Baldwin-Lima-Hamilton Corporation and identified by them as type SR–4. As illustrated, the bridges are connected in parallel with power supply C— and in series opposing relationship across their output corners. The output of bridge 122, however, is attenuated by a factor of two, as compared with bridge 121, the resistors 170 and 171 in the output circuit of bridge 122 being equal in impedance.

Weighing system 110 further includes a coupling transformer 181 having a balanced center-tapped primary winding 182 and a secondary winding 183. The center tap of primary winding 182 is connected directly to the fixed terminal 163 of selector switch 161. The end terminals of primary winding 182 are connected to the two output terminals of a chopper 184, the output terminals of chopper 184 being connected to terminal 173 of selector switch 162. Chopper 184 may be of conventional construction and is provided with a driving coil 185 connected to a suitable A.C. supply 186.

One terminal of secondary winding 183 of coupling transformer 181 is grounded and the other terminal is connected to the input of an A.C. amplifier 187. The output of amplifier 187, which may be quite conventional in construction, is connected to fixed terminal 188 of a single-pole double-throw selector switch 189 having two output terminals 194 and 196. Terminal 196 is returned to ground through a voltmeter 192. Terminal 194 is connected to a suitable D.C. supply D— through a diode 197 and is also connected to a D.C. amplifier 198 through a second diode 199. The input of amplifier 198 is by-passed to the D— supply by a capacitor 201. The output of D.C. amplifier 198 is connected to a Schmitt trigger circuit 202 which, in turn, is coupled to a toggle flip-flop circuit 203. Circuit 203 is utilized to actuate a relay driver circuit 204.

Relay driver circuit 204 controls the operation of a main control relay 205 having an operating coil 206 and including two sets of normally closed contacts 207 and 208 and a set of normally open contacts 209. Contacts 207 are utilized to control the operation of a second relay 211 comprising an operating coil 212 and a set of normally closed contacts 213. Thus, the coil 212 is connected in series with normally closed contacts 207 between the D— supply and ground.

The auxiliary control relay 211 comprises a means for changing the impedance of one leg of bridge circuit 122 to modify the output of this transducer as described more fully hereinafter. Thus, contacts 213 of relay 211 are connected in a series circuit, beginning at ground, that includes a manual-automatic selector switch 214, a potentiometer 215, and a resistor 216, the circuit being connected to output terminal 148 of bridge 122. For automatic operation, switch 214 is closed, as shown in FIG. 4.

The main control relay 205, in addition to controlling relay 211, also actuates the gate operating devices 13 and 16. Thus, gate operator 13 is energized from A.C. supply 186, having one line connection direct to the A.C. supply with the other energizing connection extending through normally open contacts 209 of the main control relay and through a manual-automatic selector switch 218 back to the A.C. supply. Switch 218 is ganged with switch 214 and, like switch 214, is closed for automatic operation and opened for manual operation. A similar connection is employed for gate operator 16, this device having one direct line connection to the A.C. supply and a return circuit that extends through the normally closed contacts 208 of relay 205 and through selector switch 218. To provide for manual operation, a manual load switch 221 is connected from gate operating device 13 to the A.C. supply, in shunt relation to relay contacts 209 and selector switch 218. Similarly, a manual control switch 222 is connected from gate operating device 16 to the A.C. supply, in shunt with relay contacts 208 and selector switch 218.

Weighing system 110, like the previously described system 10, requires calibration prior to use. Initially, in setting up the system, strain gauges 121 and 122 are bonded to a structural member that is subject to the full load to be imposed upon the system. The two gauges are located as close to each other as practical in order that they may be subject to substantially identical environmental conditions. With the circuit connected up as illustrated in FIG. 4, selector switches 161, 162 and 189 are actuated to the uppermost level of each switch, closing circuits to switch contacts 166, 176 and 196 respectively. The manual-automatic switch 214, 218 is set to the open or manual position. Under these conditions, and with weighing hopper 14 carrying the intended tare weight, the variable impedances 154 and 155 are adjusted to establish a null output from strain gauge bridge 122. Inasmuch as the bridge is D.C. excited, the output signal appearing at terminals 166 and 176 is a D.C. signal. However, this signal is inverted to an A.C. signal by means of the chopper 184, amplified in the amplifier 187, and supplied as an A.C. signal to voltmeter 192. Calibration is effected by adjusting resistors 154 and 155 until voltmeter 192 indicates a null condition has been reached.

After bridge 122 has been calibrated for the tare weight of the weighing hopper, the selector switches 161 and 162 are moved to their second position, in which circuit connections are completed to contacts 165 and 175. With the selector switches 161 and 162 in this condition, and with the manual-automatic switches remaining open, the signal supplied to instrument 192 represents the output of strain gauge 121 only. Variable resistors 151 and 152 are then adjusted until the instrument registers zero voltage, thereby establishing an electrical null point for the tare weight with respect to transducer 121.

After the two bridges have been independently calibrated for tare weight, as described above, selector switches 161 and 162 are actuated to their lowermost position, as shown in FIG. 4, this being the normal operating position for the selector switches during use of the weighing system. The weight of material desired to be measured is placed in weighing hopper 14. Manual-automatic switches 214 and 218 are closed to the automatic position. Selector switch 189 is retained in a position effecting an electrical connection to voltmeter 192. As can be seen from FIG. 4, closing of switch 214 is effective to connect resistors 215 and 126 in parallel with resistor 143 of bridge 122 between terminal 148 and ground. Potentiometer 215 is adjusted until the output of the system, which now entails the outputs of both bridges connected in series opposing relationship, reaches a null condition. This establishes the load weight for weighing hopper 14, determining an electrical null condition for the complete system that is definitive of the desired weight to be discharged in each operation of the system.

Figure 5:
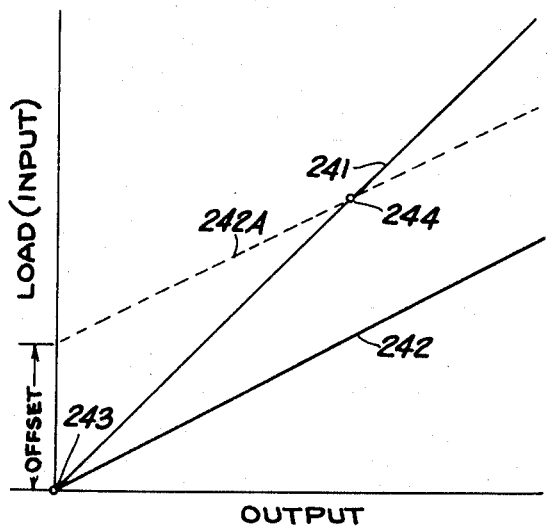
FIG. 5 illustrates certain operational characteristics of the transducer means of FIG. 4.

An understanding of the effect of the addition of resistors 215 and 216 to transducer 122 can best be reached by consideration of FIG. 5. In FIG. 5, the input-output line 241 is representative of operation of bridge 121. This load characteristic does not change once transducer 121 has been calibrated for tare weight conditions. Load characteristic 242 illustrates the operation of bridge 122. As noted hereinabove, the two bridges are essentially identical in construction, the difference in slope of operating characteristics 241 and 242 resulting from the incorporation of voltage divider 170, 171 in the output of strain gauge 122. However, the two bridges have a common null position identified at point 243, this being the null condition corresponding to the tare weight of the weighing hopper.

When resistors 215 and 216 are connected into bridge circuit 122, however, the input-output characteristic for this transducer is substantially modified. The resulting load characteristic for the second transducer is represented, in FIG. 5, by dash line 242A. Inasmuch as the slope of the load characteristic for the second transducer is substantially different from that of the first transducer, and because the slope remains substantially unchanged, load characteristics 241 and 242A intersect at a second null point 244. This is the null point for which the system is calibrated with respect to the weight of material to be discharged.

After the system 110 has been fully calibrated, as described above, it is ready for operation. Switches 161, 162, 189, 214 and 218 are all actuated to the positions shown in FIG. 4. Assuming that operation is initiated with weighing hopper 14 at the calibrated tare weight, a null signal condition is established at the output terminals of the two interconnected transducers, terminals 164 and 174. This null signal condition is detected in the D.C. amplifier 198, establishing an output condition for the D.C. amplifier that permits Schmitt trigger circuit 202 to apply a signal pulse to the toggle flip-flop circuit 203. Flip-flop circuit 203 is thereby switched to a given stable operating condition in which it is effective to energize relay driver circuit 204 and, accordingly, to energize relay 205 by completing an operating circuit for coil 206. Accordingly, the contacts 208 open, de-energizing gate operating device 16. Contacts 209 close, energizing gate operating circuit 13 to open discharge gate 12 of storage hopper 11. At the same time, contacts 207 of the main relay are opened, de-energizing auxiliary relay 211. Accordingly, contacts 213 of the auxiliary relay are closed and impedances 215 and 216 are consequently connected in circuit with transducer 122. Thus, transducer 122 is connected to operate along its alternate input-output characteristics 242A (FIG. 5) during the period in which material is discharged from the supply hopper into weighing hopper 14.

With the build-up of material in weighing hopper 14, the output of bridges 121 and 122, following characteristics 241 and 242A respectively, eventually equalize, reaching null point 244. At this point, the desired quantity of material is present in weighing hopper 14, according to the previous calibration. When this null condition is reached, it is again sensed by circuit 198 and the output signal from this circuit to Schmitt trigger 202 permits the trigger circuit to pulse toggle flip-flop 203. As a result, the flip-flop circuit is actuated to a second stable state in which relay driver 204 is de-energized and, accordingly, the main control relay 205 reverts to its de-energized condition.

When control relay 205 drops out, contacts 208 again close. This completes an energizing circuit to gate operator 16, opening discharge gate 15 and discharging material present in weighing hopper 14. Contacts 209, on the other hand, are opened upon de-energization of the relay, thereby breaking the operating circuit for gate operating device 13 with the result that the discharge gate 15 for the storage hopper is closed, interrupting the flow of material into the weighing hopper. This completes the first discharge cycle for the system.

At the time relay 205 is de-energized, its contacts 207 again close. Closing of these contacts is effective to complete an energizing circuit for auxiliary relay 212, with the result that its contacts 213 open. Opening of contacts 213 is effective to disconnect resistors 215 and 216 from the parallel connection with bridge resistance 143. Accordingly, transducer 122 is restored to its no-load or tare measuring condition.

As material is discharged through gate 15 of weighing hopper 14, the weighing hopper is eventually reduced in weight to the original tare weight. When this occurs, a null output condition is again realized by both transducers 121 and 122, this being the null point 243 in FIG. 5. The null condition is again detected by amplifier 198, actuating trigger circuit 202 and again pulsing toggle flip-flop 203. Thus, the flip-flop circuit is driven to its first operating condition, energizing relay driver 204 and initiating a second weighing cycle. This second weighing cycle proceeds as described above. It is thus seen that system 110 operates automatically to discharge material into weighing hopper 14 until the desired weight of material is present in the weighing hopper, at which time the weighing hopper is dumped and the discharge material and until the emptying operation is complete.

In some instances, it may be desirable to operate weighing system 110 manually as, for instance, when it is desired to empty storage hopper 11 completely without weighing out predetermined quantities of material or when the material remaining in the storage hopper is insufficient to make up the predetermined amount to be weighed. Under these circumstances, switches 214 and 218 are actuated to the manual position. Loading of material into weighing hopper 14 can then be accomplished by utilization of switch 221, which by-passes control relay 205 completely. Dumping of weighing hopper 14 can be accomplished by utilization of the manual control switch 222 to actuate gate operating device 16, again by-passing the control relay.

In the foregoing description of weighing system 110, transducers 121 and 122 are D.C. excited. The bridges could be directly excited by A.C. current, in which case the chopper 184 may be eliminated, driving amplifier 187 directly from the bridges. On the other hand, it is equally possible to eliminate all A.C. stages in the control circuit, replacing amplifier 187 with a suitable D.C. amplifier.

Amplifiers 187 and 198 are of conventional construction and this is equally true with respect to Schmitt trigger 202. Flip-flop 203 may comprise any suitable bistable trigger circuit or, if desired, may be combined with circuit 204 by utilizing a latching relay circuit. The A.C. and D.C. power supplies are not shown in detail inasmuch as these devices may be completely conventional in construction.

In the foregoing specification, two distinctively different forms of transducer have been described in connection with different embodiments of the present invention. Other transducers may be utilized as desired provided it is possible to calibrate the same to obtain corresponding results. Thus, the present invention is applicable to a variety of different applications, using different forms of transducers, to afford positive-acting precision measurement systems which are almost fully independent of changes in environment with respect to the transducers.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. A measurement and control system comprising:

first and second transducer means for sensing a given physical condition to develop respective first and second output signals representative thereof, said transducer means having substantially different input-output characteristics and being subject to essentially identical environments;

control means, coupled to both of said transducer means, for additively combining said output signals to develop a control signal that is representative of said physical condition and substantially independent of environmental changes affecting said transducers;

and means, coupled to one of said transducer means, for modifying the input-output characteristics of one of said transducer means to define a plurality of distinctive control signals representative of predetermined levels of said physical condition.

2. A measurement and control system comprising:

first and second transducer means for sensing a given physical condition to develop respective first and second output signals representative thereof, said transducer means having substantially different input-output characteristics and being subject to essentially identical environments;

control means, coupled to both of said transducer means, for additively combining said output signals, in subtractive relation to each other, to develop a control signal that is substantially independent of environmental changes affecting said transducers;

and means, coupled to one of said transducer means, for modifying the output of one of said transducer means relative to the other to define a plurality of distinctive control signal nulls representative of predetermined levels of said physical condition.

3. A measurement and control system comprising:

first and second strain gauges for sensing a given physical condition to develop respective first and second electrical output signals representative thereof, said strain gauges having substantially different load-output characteristics and being subject to essentially identical environments;

control means, coupled to both of said strain gauges, for additively combining said output signals in bucking relation to each other to develop a control signal that is substantially independent of environmental changes affecting said strain gauges;

and means, coupled to one of said strain gauges, for modifying the output thereof relative to the other strain gauge to define a plurality of distinctive control signal nulls representative of predetermined levels of said physical condition.

4. A measurement and control system comprising:

first and second strain gauges, each comprising a bridge circuit including one strain-sensitive impedance, for sensing a given physical condition to develop respective first and second electrical output signals representative thereof, said strain gauges having load-output characteristics with substantially different slopes and being subject to essentially identical environments;

control means, coupled to both of said strain gauges, for additively combining said output signals in bucking relation to each other to develop a control signal that is substantially independent of environmental changes affecting said strain gauges;

and means for changing the impedance of one leg of one of said bridge circuits to modify the output thereof relative to the other strain gauge bridge to define a plurality of distinctive control signal nulls representative of predetermined levels of said physical condition.

5. A measurement and control system comprising:

an A.C. signal source;

first and second force transformers mechanically connected in series with each other and electrically coupled to said A.C. source, for sensing a given physical condition to develop respective first and second electrical output signals representative thereof, said force transformers having differential load-output characteristics and being subject to essentially identical environments;

control means, coupled to both of said force transformers, for additively combining said output signal in phase opposition to each other to develop a control signal that is substantially independent of environmental changes affecting said force transformers;

and means, coupled to one of said force transformers, for modifying the output thereof relative to the other force transformer to define a plurality of distinctive control signal nulls representative of predetermined levels of said physical condition.

6. A weighing system comprising:

a storage container for storing material to be weighed;

first discharge means for discharging material from the storage container;

a weighing container positioned to receive material discharged from the storage container;

second discharge means for discharging material from the weighing container;

first and second strain gauges, mechanically connected to said weighing container, for sensing changes in the weight thereof to develop respective first and second electrical output signals, said strain gauges being subject to essentially identical environments;

control means, coupled to both of said strain gauges, for additively combining said output signals in bucking relation to each other to develop a control signal that is substantially independent of environment changes affecting said strain gauges;

means, coupled to at least one of said strain gauges, for adjusting the output thereof relative to the other strain gauge to define a control signal null corresponding to the tare weight of the weighing container;

and means for supplying said control signal to both of said discharge means to control actuation thereof.

7. A weighing system comprising:

a storage container for storing material to be weighed, having a discharge gate;

first gate operating means for operating said storage container discharge gate;

a weighing container, having a discharge gate, positioned to receive material discharged through the storage container gate;

second gate operating means for operating said weighing container discharge gate;

first and second strain gauges, mechanically connected to said weighing container, for sensing changes in the weight thereof to develop respective first and second electrical output signals, said strain gauges having substantially different load-output characteristics and being subject to essentially identical environments;

control means, coupled to both of said strain gauges, for additively combining said output signals in bucking relation to each other to develop a control signal that is substantially independent of environment changes affecting said strain gauges;

means, coupled to one of said strain gauges, for modifying the output thereof relative to the other strain gauge to define a plurality of distinctive control signal nulls representative of predetermined weights for said weighing container, one of said nulls corresponding to the tare weight of the weighing container;

and means for supplying said control signal to both of said gate operating means to control actuation of said discharge gates.

References Cited in the file of this patent

UNITED STATES PATENTS

| | | |
|---|---|---|
| 2,599,005 | Macgeorge | June 3, 1952 |
| 2,766,981 | Lauler et al. | Oct. 16, 1956 |
| 2,801,874 | Macgeorge | Aug. 6, 1957 |
| 2,815,480 | Ruge | Dec. 3, 1957 |
| 2,886,780 | Schauffler | May 12, 1959 |
| 2,938,701 | Thorsson et al. | May 31, 1960 |